No. 848,504. PATENTED MAR. 26, 1907.
H. SOAR.
SPEED INDICATOR AND RECORDER.
APPLICATION FILED OCT. 13, 1905.

4 SHEETS—SHEET 2.

Witnesses:

Inventor
Henry Soar
By James L. Norris
Atty

No. 848,504. PATENTED MAR. 26, 1907.
H. SOAR.
SPEED INDICATOR AND RECORDER.
APPLICATION FILED OCT. 13, 1905.
4 SHEETS—SHEET 3.
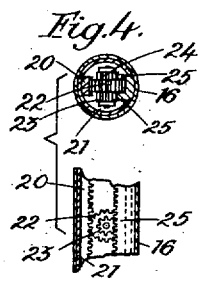
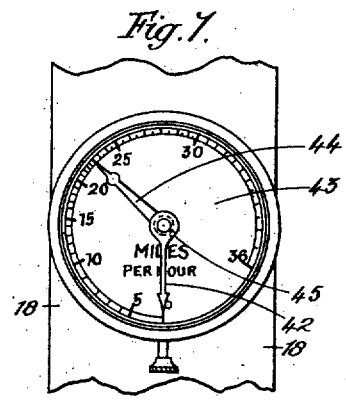
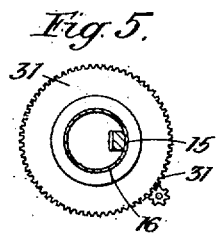
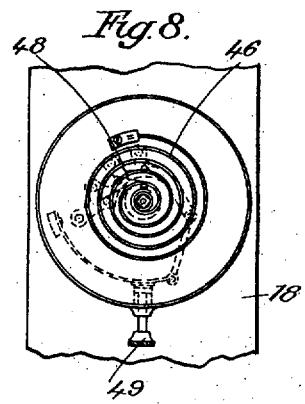
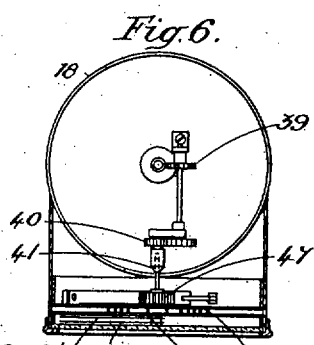
Witnesses:
Inventor
Henry Soar No. 848,504. PATENTED MAR. 26, 1907.
H. SOAR.
SPEED INDICATOR AND RECORDER.
APPLICATION FILED OCT. 13, 1905.

4 SHEETS—SHEET 4.

Witnesses:

Inventor
Henry Soar
By James L. Norris
Atty

THE NORRIS PETERS CO., WASHINGTON, D. C.

UNITED STATES PATENT OFFICE.

HENRY SOAR, OF GOODMAYES, ENGLAND.

SPEED INDICATOR AND RECORDER.

No. 848,504.　　　　Specification of Letters Patent.　　　　Patented March 26, 1907.

Application filed October 13, 1905. Serial No. 282,642.

*To all whom it may concern:*

Be it known that I, HENRY SOAR, a subject of the King of Great Britain, residing at 41 Castleton road, Goodmayes, Essex, England, have invented certain new and useful Improvements in Speed Indicators and Recorders, of which the following is a specification.

The object of this invention is an improved apparatus for automatically and continuously recording on paper sheets, or cards, or other material the speed rate of and the mileage covered by a traveling vehicle—such as a motor-car, motor-bus, electric tram car or locomotive—and thus by the production of legible graphic records to furnish indisputable evidence in the form of an automobile-log of the actual performance of the vehicle's constant movements, always available for immediate or future reference, also applicable to other revolving bodies for showing the speed of and the number of their revolutions. In connection therewith is a speed-indicator showing on a dial the variable speed rate, together with an auxiliary hand registering the maximum speed attained during any interval, the latter being controlled by a switch. In addition, a trip-register is added showing the mileage run from any starting-point, also an audible indicator giving warning of a predetermined speed limit, all or either of which may be included in the recording instrument, as desired.

My invention is illustrated in the annexed drawings, in which—

Figure 1:
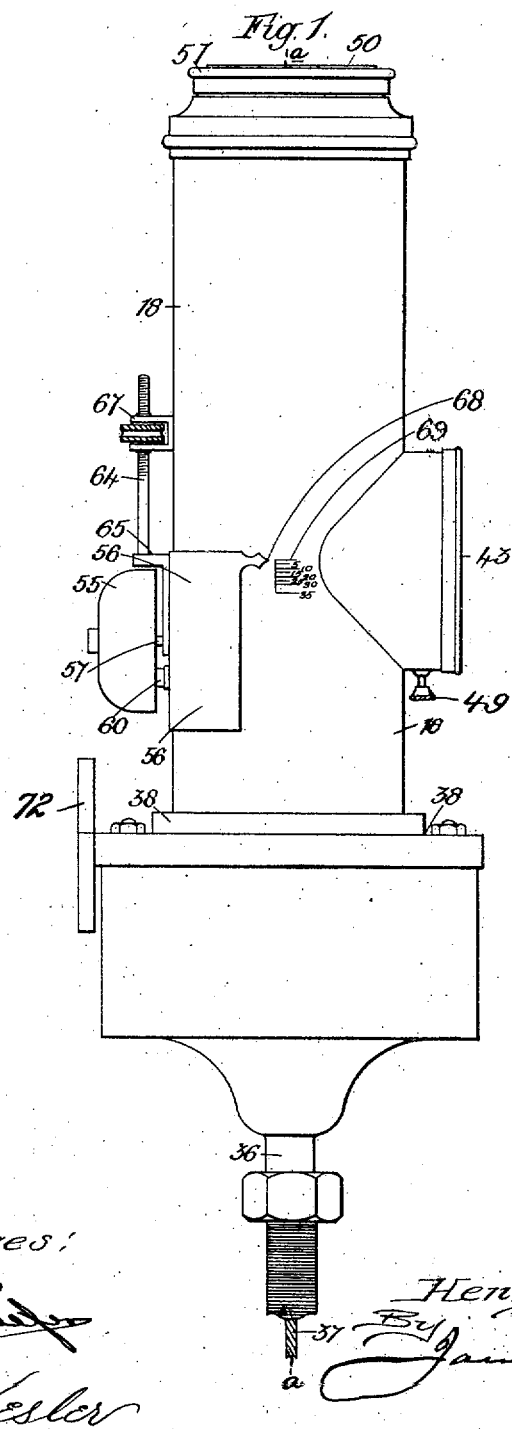
Figure 2:
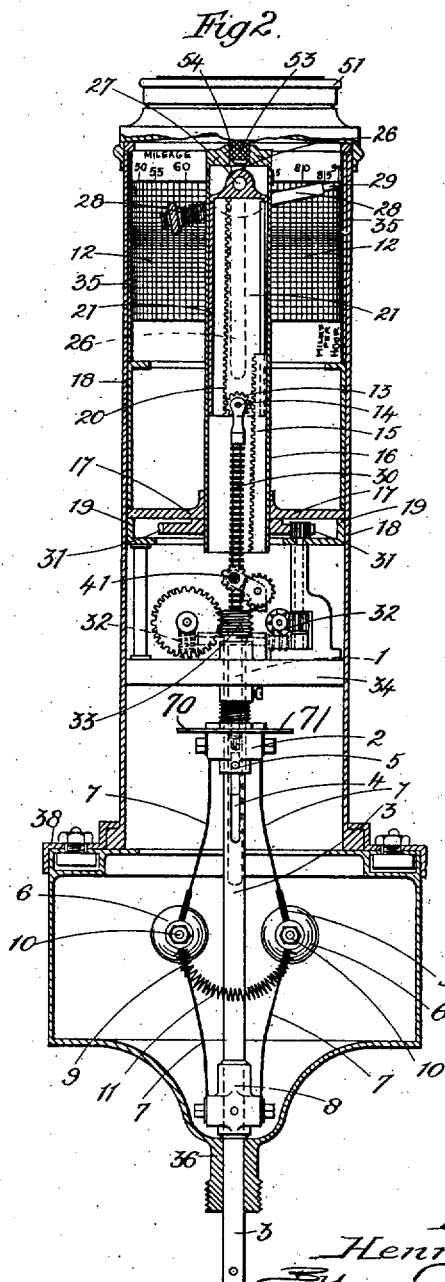
Figure 10:
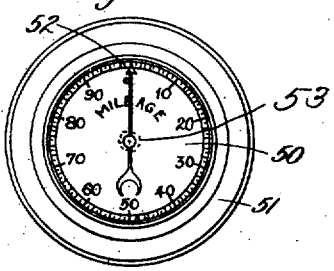
Figure 13:
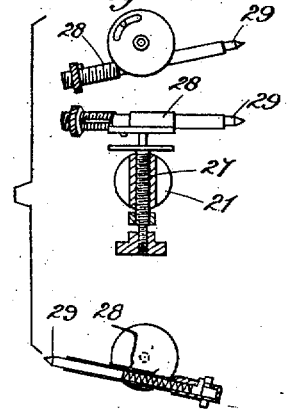
Figure 11:
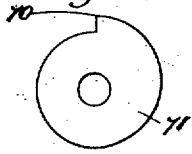
Figure 12:
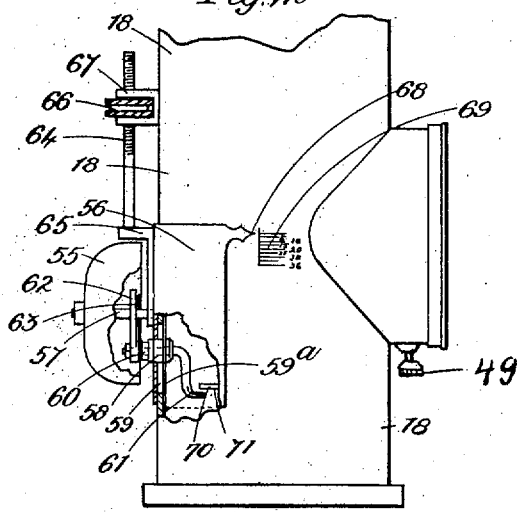

Figure 1 is an elevation of a complete apparatus. Fig. 2 is a part-sectional elevation of the complete apparatus on the line *a a* of Fig. 1. Fig. 3 is a section of the racks and guide-tubes as constructed in Fig. 2. Fig. 4 is a similar view to Fig. 3, but of modified construction. Fig. 5 is a section of one tube and rack with the spur-wheel attached. Fig. 6 is a section showing the arrangement of the variable-speed and maximum-speed device. Fig. 7 is an elevation of the variable and maximum speed dial. Fig. 8 is an elevation of the speed-dial, the face and hands being removed to show the spring, ratchet, and releasing appliance of the maximum-speed hand arrangement. Fig. 9 is a portion of the swivel-jointed rod, showing the swivel-joint. Fig. 10 is a plan of the mileage-dial. Fig. 11 is a plan of cam-disk for operating the bell appliance. Fig. 12 is part side section showing the striking mechanism and scale for indicating predetermined speed limits. Fig. 13 are views showing the construction of the pencil-carrier.

In this apparatus the method of indicating the variations of velocity is by the to-and-fro movement of a swivel-jointed rod 1, the lower part of which is connected with the sliding collar 2 of a specially-constructed centrifugal governor, the spindle 3 of which for a certain distance down is made tubular to allow for the travel of the rod 1 and vertically slotted. Through the slot 4, by means of a pin 5, the collar 2 and rod 1 are connected.

The extensive range of calibration necessary to indicate the wide variations in the speed rate of automobiles is retained within effective and uniform limits by a system of spring resistance acting against the centrifugal force produced by the velocity of rotation of the governor-weights 6 when actuated by the motion of the moving vehicle. Similar arrangements are also adapted for showing the speed rate of revolving bodies other than vehicles. For this purpose links 7, connecting the balls or weights to a fixed collar 8 on the spindle of the governor and to the sliding collar 2, are formed of flat leaf-springs, the curvature of which as they are depressed by the acceleration of centrifugal force retard the extension of the radial circle of the governor-weights and cause the to-and-fro travel of the sliding collar 2 to be more uniform and of a greater range. These links 7 are preferably connected with the balls by attaching them to forked bearings 9, journaled onto spindles 10, passing through the center of the weights 6. By forming the upper links 7 of a different elastic power to that of the lower 7 separate grades of resistance may be obtained still further increasing the regularity and length of range.

When the accelerated force has mastered the elasticity of the leaf-springs, then further resistance is brought into work by the employment of helical springs 11, the ends of which, formed into rings or eyes, are threaded on the extremities of the spindles 10, passing through the centers of the governor-balls 6, thus lineally connecting the balls, suitable collars and nuts keeping them and the forked bearings of the leaf-springs in position. The helical springs are formed loop shape, which permits of their action coming into operation only at a certain definite range of speed and prevents any possibility of their hanging up the governor at the lower speeds, at which time the leaf-springs 7 only are in action. The curvature, length, and strength of the springs being in both instances made to positive gages determine the uniformity of action, as by thus opposing the outward extension of the governor-weights 6 by efficaciously varying the strength of the springs 7 and 11 and by allowing the helical springs 11 to come into operation at a definite period any reasonable compass of reading can be obtained permitting of different types of this instrument being constructed.

In the mechanism for registering on a chart 12 the continual variations of the speed rate the to-and-fro travel of the swivel-jointed rod 1 is multiplied by an arrangement of rackwork actuated by a pinion 13 rotating on an axle 14 at the top of the rod 1. Two racks are provided, of which one, 15, is a fixture in a tube 16. This tube is carried on a ring-plate or turn-table 17, fitting into the outer cylindrical cover 18, being supported by a flange 19 on the upper part of the gear-box, of which it forms the top. The other rack 20 is held within an inner tube 21, such tube sliding in the outer one, 16, a portion of this sliding tube 21 being cut away to allow clearance for the fixed rack 15, the edges of which serve as guides. Between these racks the pinion 13 operates. As it traverses along the fixed rack 15 it rotates upon its axis 14 and gives to the movable rack 20 a velocity equal to twice that of the travel of the rod 1. To still further multiply this movement, the rod 1 may be made to carry three pinions 22, 23, and 24, as shown at Fig. 4, in place of the one, 13, concentric on an axle 14, rotating in a forked bearing at the top of the rod 1, while a double rack 25 takes the place of the single fixed rack 15, a space being left between for the center pinion 22 to clear. As the outer ones, 23 and 24, traverse this double rack 25 the center one, 22, geared into the movable rack, rotates on the axis 14 common to the three 22, 23, and 24, and thus increases the travel of the sliding rack 20 proportionately to the increased size and number of teeth on the periphery of this center wheel 22. By such means extended markings on diagrams 12 of the vehicle's rate of speed are obtainable. From near the top and for a certain distance down two slots 26 are cut oppositely in the tube 16, holding the fixed rack 15 or racks 25. Through the top of the sliding rack-tube 21 a hole 27 is made, corresponding with these slots 26 in the outer tube 16. Through the slots 26 and the hole 27 in the tubular sliding-rack guide a carrier 28 is threaded for holding a pencil or other marker 29. By this means the marker 29 is caused to travel with the center rack 30 and by a method to be described likewise to rotate with the tubes 16 and 21. Arrangements are made in the carrier 28 by spring tension to keep the pencil in contact with the chart 12.

To the lower face of the turn-table 17, carrying the tube 16, which contains the racks 15 20, a spur-wheel 31 is affixed. Motion is imparted to this toothed wheel by a train of worm-gear 32, actuated by a worm 33 at the top of the tubular governor-spindle 3. The upper journal of this spindle is carried in a bush on the center of a plate 34, fixed to the cover of the instrument, above which bush the worm is affixed to the spindle. On this same plate the worm-gearing 32 is held, the train being so arranged as to rotate at a definite angular velocity the spur-wheel 31, whereby the tube 16, and with it the pencil 29, is moved a certain distance for each revolution of the vehicle-wheel or other primary revolving body.

The to-and-fro markings of the pencil caused by the fluctuations of the governor register the rate of speed of the linear or rotatory velocity, and as the pencil rotates under the influence of the worm-gearing 32 the horizontal spaces receiving the tracings show the mileage covered by the vehicle or that of the aggregate of revolutions made. The multiplying movement regulates the position on the diagram of the vertical lines, while the angular velocity of the gear rotating the pencil, together with the size of the chart-holder, limits the position of the horizontal lines. The card-chart 12 thus suitably divided into spaces is bent into the form of a cylinder and placed in a drum 35, which drum is inserted in its turn into the outer cylindrical cover 18, so arranged as to be concentric with the medial line of the sliding rack-tube 21. If desirable, the chart-holder 35 may be made to fit onto a flange on the cover, thus forming the upper part of the case.

The tube 16, holding the racks 15 20, may be connected to the turn-table 17 and held in place by a friction-disk, permitting of the tube being rotated by hand when required to place the marker 29 at zero on the chart 12, or the drum itself may be so arranged as to revolve under friction in the cover in order that the zero-point of the chart 12 may be brought into line with the marker 29 when required.

The governor-spindle 3, passing through a bearing 36 at the lower end of the outer case 18, is actuated by means of flexible shafting 37 or other effective arrangement in connection with suitable mechanism for transmitting velocity from the traveling wheel or other revolving body, the linear or rotatory velocity of which is to be ascertained. For such purpose the following or any other suitable method may be adopted. To the inner side of one of the front wheels of the vehicle a disk ring is clipped, screwed, or otherwise affixed concentric with the axle of the wheel.

Against this ring a disk is frictionally pressed, the outer edge of the disk being formed, preferably, of vulcanized rubber. A bracket attachment carries the journal-bearings of the disk, which bearings are adjustable along a portion of the bracket and can be fixed in position at any definite point. The other portion of the bracket is hinged to the former and bolted in some convenient way to the steering-knuckle or other suitable part of the vehicle, as most expedient. The hinge is formed with a spring action in order to press the disk into frictional contact with the ring under every movement of the road-wheel. One end of the axle carrying the friction-disk is connected with the lower end of the governor-spindle by flexible shafting or other suitable means.

In order to obtain adequate centrifugal force to sufficiently actuate the travel of the governor-collar 2 when running at low speeds, the velocity ratio of the worm-gear 32 is suitably adjusted as to allow for the revolutions of the road-wheel, the speed of which is to be registered, being correlatively increased in the speed of the governor. As, for sake of convenience, standard instruments are adopted irrespective of the wheel's circumference, it is necessary to arrange for the correct diameter of the disk and the precise position of the disk's line of travel on the ring. This can be readily determined for any particular vehicle by a simple equation and when once the position is fixed requires no further attention. I will take as an instance that it is arranged that the speed of the centrifugal governor-spindle shall allow of an increase of six times the speed of the traveling wheel. This proportion of increase will be found in practice sufficient to show a speed as low as five miles an hour when running on a vehicle-wheel making seven hundred and twenty revolutions to the mile. A wheel twenty-eight inches—i. e., 711.2 millimeters—in diameter makes seven hundred and twenty revolutions in traversing a mile. A friction-disk two inches—i. e., 50.8 millimeters—in diameter is a useful size to work with such standard instrument. By multiplying the diameter of the disk by six and dividing the product by two the answer will give the radius of the driving-circle on the ring over which the two-inch disk will travel exactly six times while the twenty-eight-inch road-wheel is making one revolution: $50.8 \times 6 \div 2 = 152.4$. Therefore a circle of 152.4 millimeters radius is the precise position of a two-inch disk's line of travel to allow of the speed of the governor-spindle being increased six times for each revolution of a twenty-eight-inch vehicle-wheel. Hence to obtain the required radius for wheels other than twenty-eight inches in diameter the rule of proportion is thus used: As 711.2 is to the diameter of the vehicle-wheel the speed of which is to be registered, so is 152.4 to the answer. Examples:

$711.2 : 700 :: 152.4 : 150$ millimeters, (the required radius.)

$711.2 : 800 :: 152.4 : 171.4x$ millimeters.

$711.2 : 900 :: 152.4 : 192.3 -$ millimeters.

By the same method other measurements can be taken as standards, and their corresponding figures can be arrived at. A suitable ring with the driving-line marked can thus be furnished for any particular vehicle, or various markings may be arranged on a broader ring for use with several different sizes of tires. By another method the disk and ring is kept to one standard position for any size of wheel, the necessary adjustment being arranged as follows: An axle connected with the flexible shafting from the friction-drive, before described, is mounted on a bracket attached to the case. This axle carries a friction-disk. In radial contact with this disk is another adjustable on the spindle of the instrument, which can be advanced toward or receded from the center of the former by raising or lowering the latter on its spindle and can be fixed at certain determined positions on the spindle, as shown on a scale, such scale marking the adjustment required.

When adapted to tram-cars, the driving mechanism is preferably actuated by means of a supplementary wheel running on the rail, the wheel being so adapted by spring tension or otherwise as to keep the rail. It is important to have the motion transmitted independently of the wheels in order to obtain a correct record of the car's travel, as on the application of the brake the wheels are often locked, and instead of coming to rest skid along the metals. The weight of the car, the condition of the track, the steepness of the gradient, and the speed when the brake is applied have all to be considered in respect to the liability of the wheels skidding.

*The variable-speed indicator.*—Upon the upper part of the jointed rod above the swivel, but below the pinion or pinions actuating the multiplying device, circular grooves 30 are cut, forming a rack. Into this rack a wheel 39 gears, Fig. 6, that in its turn gears with a pinion 40, the pivot 41 of which carries the index-hand 42, operating over a dial 43 on the case, Fig. 7. This wheel 39 and pinion 40, being held on the same plate 34 as that of the gear 32, rotating the pencil-tube 29. The grooved rod-rack 30, being swiveled to its lower portion, does not revolve with the governor-spindle 3, but as the governor-balls are radially moved travels to and fro only by the action of centrifugal force. The turn-table 17, being rotated by the action of the worm-gear 32, carries the grooved part of the swivel-jointed rod slowly round with it.

As the to-and-fro movement of the grooved rod is dependent on the rotation of the centrifugal-governor spindle 3, which derives its impetus from the velocity of the primary revolving body, so the movement of the pointer will be in direct relationship, and the dial can be calibrated to show the rate of speed in a measure of length or in revolutions at any particular unit of time. 38 is an adjustable flange for turning the dial 43 to face any position.

*Maximum-speed indicator.*—A maximum-speed hand 44, Fig. 7, is caused to move forward over the dial by a projection 45 on the index-hand. The arrangement I adopt for the purpose is as follows: A hand 44 is attached to a spindle passing freely through the dial-plate 43. Through the center of this spindle the pivot of the indicating-hand 42 passes. A pin 45 on the latter hand engages with a stop on the former, whereby the maximum hand 44 is carried forward by the variable-speed-indicating hand 42 as it passes over the dial 43. To the spindle and behind the dial a spirally-coiled spring 46, Fig. 8, somewhat resembling a balance-spring of a clock is concentrically fixed by its inmost coil, the outer end being attached to the back plate. This spring is so wound as to rotate the spindle, and with it the maximum hand, back toward a zero-point. Such return is prevented by means of a ratchet-wheel 47, attached to the spindle controlled by a pawl or pawls 48, or the return is controlled by means of friction set up by a loop frictionally passing over a disk on the spindle and held in tension by a bow-spring, the loop and spring being suitably held by links and studs on the plate. On disengaging the pawl 48 or releasing the pressure of the bow-spring by the movement of a push-piece actuated by a press-button 49 outside the case 18 the return of the hand at once takes place by reason of the action of the balance-spring. In the case of requiring the maximum hand 44 to return only at the time of exchanging the log-chart 12 then in place of the push-piece 49 outside the case the act of lifting the chart-drum 35 sets in action a spring that actuates a push-piece, its length adjusted so as to disengage the pawl from the ratchet-wheel or to release the friction of the bow-spring on the spindle, and thus allows the balance-spring to operate and return the hand.

*The mileage trip-recorder.*—The mileage device is self-contained in a case 51, fitting over the top of the outer cover 18, preferably arranged to lift and to be swung round on a pin working in a socket on the cover 18 when the chart 12 is being exchanged. Over the dial 50 the pointer 52 moves frictionally, connected with the tube holding the fixed rack 16 by means of a plug 53 at the lower end of the spindle holding the pointer. This plug fits into a cavity 54 at the top of the tube 16 under the pressure of a spring. By this means the hand is caused to rotate under the same movement as that which operates the rotation of the marker and indicates the distance traveled or the number of revolutions made on an index marked on the dial 50, corresponding with that which is being registered on the chart 12, a balance-spring on the spindle returning the hand to zero whenever the friction-plug is loosened from its socket. This can be held in check by a pawl-and-ratchet arrangement and the return operated by a push-pin outside the case.

*Speed-limit indicator.*—A bell attachment 55, Fig. 12, can be added for indicating predetermined speed limits. This consists of a plate 56, shaped to an arc of the outer curvature of the case 18, over a portion of which it is caused to travel. This plate 56 holds a pillar 57 for supporting the bell and a bush 58, that slides along a perpendicular slot 59, cut in the case 18 at a suitable position, the plate 56, being held in contact with the case by means of a concave spring 59$^a$ on the end of the bush 58, being kept thereon by a nut 60, which spring 59$^a$ frictionally presses against the interior of the case 18. To keep out dust and weather, the plate is made of such proportions as to cover the slot under its whole range of movement. An arbor journaled through the bush holds at its inner end a lever 61, while to the outer end a hammer 62 is attached, operating within the bell 55 and under control of a spring 63. The plate attachment 56 is caused to move the length of the slot as required by means of a screw-threaded rod 64, attached to a bracket 65 on the upper part of the plate 56. This rod is turned by a thumb-wheel 66, held between two brackets 67 on the case 18, and through which and a screw-threaded hole in the wheel the threaded rod 64 passes. A pointer 68, forming part of the plate 56, can thus be moved over a scale 69 on the case so calibrated that an epicycloidal projection 70 on a steel disk 71, rising and falling with the governor-spindle 3 and revolving therewith, strikes the lever 61 at a predetermined speed as set by the pointer 68 to the scale 69, and so actuates the hammer 62, by which means an audible indication is given when such speed limit is reached. The lever may be so arranged that the projection acts as a cam and as it is revolved lifts the lever and again releases it, thus giving the lever the necessary impetus to enable the hammer to strike the bell. In place of the disk an arm or arms revolving with the spindle operates the lever under similar conditions. The width of the meeting-points of lever and projection limits the extent of the alarm.

72 is a bracket attached to the adjustable flange 38 for connection of the apparatus to a vehicle.

What I claim, and desire to secure by Letters Patent, is—

1. In an apparatus of the class described, a governor, a rotatable shaft supporting the same, a swiveled jointed rod rotatable with said shaft and vertically movable thereon, a pinion carried at the free terminal of said rod, a fixed rack in engagement with the pinion, a marker element having a rack in engagement with the pinion and actuated thereby, a chart having a supporting means, gear mechanism coöperative with said rotatable shaft for imparting rotary movement to the marker, and indicator mechanism actuated by the gear mechanism.

2. In an apparatus of the class described, a revoluble shaft, a casing surrounding the same, a spring-controlled governor having one end fixed to said shaft and the other end slidable thereon, a rod connected to the slidable end of the governor having a pinion, rotatable elements having rack-bars operated upon by the pinion to move the same to and from each other, a marker device carried by one of the elements and movable therewith, a chart in engagement with the marker, gear mechanism coöperative with the rotatable shaft for imparting rotary movement to the element supporting the marker, an indicator coöperative with the gear mechanism, and means for resetting the indicator mechanism.

In testimony whereof I have hereunto set my hand in presence of two subscribing witnesses.

HENRY SOAR.

Witnesses:
 RICHARD CORE GARDNER,
 LYNWOOD FERDINAND GARDNER.